US00RE50140E

(19) United States
(12) Reissued Patent
Gomaa et al.

(10) Patent Number: US RE50,140 E
(45) Date of Reissued Patent: Sep. 24, 2024

(54) MASTER/SLAVE SHAFT ASSEMBLY FOR FIRE DOOR AND CURTAIN

(71) Applicant: McKeon Rolling Steel Door Company, Inc., Bellport, NY (US)

(72) Inventors: Ashraf Gomaa, Stony Brook, NY (US); Oscar Escobar, Glendale, NY (US); Andrew Lambridis, Dix Hills, NY (US)

(73) Assignee: MCKEON ROLLING STEEL DOOR CO., INC., Bellport, NY (US)

(21) Appl. No.: 17/110,617

(22) Filed: Dec. 3, 2020

Related U.S. Patent Documents

Reissue of:
(64) Patent No.: 10,145,174
Issued: Dec. 4, 2018
Appl. No.: 15/397,497
Filed: Jan. 3, 2017

(51) Int. Cl.
*E06B 9/70* (2006.01)
*A47H 5/02* (2006.01)
(Continued)

(52) U.S. Cl.
CPC ..... *A47H 5/02* (2013.01); *E04F 10/02* (2013.01); *E06B 9/70* (2013.01)

(58) Field of Classification Search
CPC ..... E04B 2009/2458; E06B 5/16; E06B 9/13; E06B 9/17; E06B 9/42; E06B 9/44; E06B 9/50; E06B 9/56; E06B 9/68; E06B 9/70; E06B 2008/1749; E06B 2009/2423; E06B 2009/2458; E06B 2009/405; A47H 5/00;
(Continued)

(56) References Cited

U.S. PATENT DOCUMENTS 2,341,217 A * 2/1944 Holtzclaw ..... A47H 1/122 248/265
3,298,197 A * 1/1967 Roth ..... E06B 9/50 160/120

(Continued)

FOREIGN PATENT DOCUMENTS

CN 201326355 10/2009
EP 0 351 459 7/1988

OTHER PUBLICATIONS

European Search Report issued in corresponding European Appln. No. EP 17 89 0684.

*Primary Examiner* — William V Gilbert
(74) *Attorney, Agent, or Firm* — Cozen O'Connor

(57) ABSTRACT

A master/slave shaft arrangement includes: a motor having an output shaft; a master drive barrel, the first end of which being rotationally driven by the output shaft of the motor, the master drive barrel having, at a second end thereof, a master drive sprocket; a synchronizing shaft that is rotationally driven at its second end by a first coupling assembly, the rotational driving of the synchronizing shaft being synchronous with the rotational driving of the master drive barrel by the motor; and a slave barrel, the slave barrel being rotationally driven at its first end by a second coupling assembly that rotationally couples the synchronizing shaft with the slave barrel to rotationally drive the slave barrel, the rotational driving of the slave barrel being synchronous with the rotational driving of the synchronizing shaft and the rotational driving of the master drive barrel by the motor.

19 Claims, 8 Drawing Sheets

(51) Int. Cl.
*E04F 10/02* (2006.01)
*E06B 5/16* (2006.01)
*E06B 9/17* (2006.01)

(58) Field of Classification Search
CPC ..... A47H 5/02; A47H 5/0325; E04F 10/02; E04F 10/06
USPC ..... 160/119–121.1
See application file for complete search history.

(56) References Cited

U.S. PATENT DOCUMENTS 4,657,059 A * 4/1987 Clauss ..... E04G 10/0662 160/120
4,828,003 A 5/1989 Kraeutler
4,856,574 A * 8/1989 Minami ..... E06B 9/32 160/166.1
6,155,324 A * 12/2000 Elliott ..... E06B 9/68 160/133
7,703,499 B2 * 4/2010 Tait ..... A63J 1/02 160/84.01
8,453,707 B2 6/2013 Lambridis et al.
2003/0000653 A1 * 1/2003 Ulatowski ..... E06B 9/361 160/84.02
2005/0087313 A1 4/2005 Nichols et al.
2005/0173080 A1 * 8/2005 Carmen, Jr. ..... E06B 9/68 160/310
2005/0241779 A1 * 11/2005 Abouloukme ..... A01G 9/227 160/122
2006/0243398 A1 * 11/2006 Schoonen ..... A01G 9/227 160/120
2006/0272782 A1 * 12/2006 Nichols, Jr. ..... A47H 5/0325 160/120
2008/0153606 A1 * 6/2008 Koop ..... F16D 7/044 464/83
2009/0008046 A1 1/2009 Roetgering
2010/0294440 A1 11/2010 Li et al. ..... E06B 9/42 160/310
2012/0168099 A1 * 7/2012 Anderson ..... E06B 9/84 160/368.1
2014/0262067 A1 9/2014 Higgins et al. ..... E06B 9/174 160/368.1
2016/0053537 A1 2/2016 Dybdahl ..... E06B 9/50 160/310
2016/0222726 A1 * 8/2016 Rupel ..... E06B 9/66
2016/0319591 A1 * 11/2016 Cheng ..... E06B 9/40
2016/0339279 A1 * 11/2016 Holz ..... A62C 2/10
2016/0348428 A1 * 12/2016 Cheng ..... E06B 9/40
2017/0112316 A1 * 4/2017 Rivera ..... A47H 5/02
2017/0234061 A1 * 8/2017 Janick ..... A62C 2/10 160/120

* cited by examiner

MASTER/SLAVE SHAFT ASSEMBLY FOR FIRE DOOR AND CURTAIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue of U.S. Pat. No. 10,145,174, issued Dec. 4, 2018, which matured from U.S. patent application Ser. No. 15/397,497, filed Jan. 3, 2017.*

FIELD OF THE INVENTION

The disclosed embodiments relate to the field of drive systems for opening and closing rolling doors or curtains.

BACKGROUND OF THE INVENTION

Existing drive systems for rolling curtains/doors employ roller barrels for rolling up and deploying curtains/doors. However, there is a limit to the width of the driven door for each barrel, based on the deflection that occurs to a barrel once it exceeds a certain length due to the barrel weight and/or the weight of the curtain or door. For example, it has been found that a 4-inch diameter barrel can extend across an opening of 24 feet, after which too much deflection of the barrel will occur. Likewise, a 3-inch diameter barrel can extend across an opening of 18 feet. But if such a barrel is made longer, the same problem of deflection will occur.

One response for traversing larger spans has been to employ barrels in a staggered configuration with each being operated by a respective motor, which barrels are synchronized together. Each barrel supports and controls a designated curtain segment and the barrels turn at the same rate so that the different curtain segments will lower and raise together. This arrangement is costly and requires multiple motors, which is undesirable with regard to, for example, motor synchronization.

SUMMARY OF THE INVENTION

It is an object of the invention to provide an improved roller assembly that overcomes the deficiencies of the prior art and that uses a single motor to drive multiple staggered barrels each carrying a designated curtain segment.

In accordance with one aspect of the present invention, a fire door or curtain assembly using a master/slave shaft arrangement extending across an opening defined by at least one structural element of a building includes: a motor; a master drive barrel having a first end and a second end, the first end being coupled to the motor so as to be rotationally driven by the motor, the master drive barrel having, at the second end, a master drive sprocket; a synchronizing shaft having a first end and a second end, the synchronizing shaft being configured to be rotationally driven at the second end of the synchronizing shaft by a coupling assembly that includes the master drive sprocket, the rotational driving of the synchronizing shaft being synchronous with the rotational driving of the master drive barrel by the motor; and a slave barrel having a first end and a second end, the slave barrel being configured to be rotationally driven at the first end of the slave barrel by a second coupling assembly that rotationally couples the first end of the synchronizing shaft with the first end of the slave barrel so as to rotationally drive the slave barrel, the rotational driving of the slave barrel being synchronous with the rotational driving of the synchronizing shaft and the rotational driving of the master drive barrel by the motor.

According to another aspect of the present invention, a master/slave shaft arrangement extending across an opening defined by at least one structural element of a building includes: a motor having an output shaft; a master drive barrel having a first end and a second end, the first end being rotationally driven by the output shaft of the motor, the master drive barrel having, at the second end, a master drive sprocket; a synchronizing shaft having a first end and a second end, the synchronizing shaft being rotationally driven at its second end by a first coupling assembly that includes the master drive sprocket, the rotational driving of the synchronizing shaft being synchronous with the rotational driving of the master drive barrel by the motor; and a slave barrel, having a first end and a second end, the slave barrel being rotationally driven at its first end by a second coupling assembly that rotationally couples the first end of the synchronizing shaft with the first end of the slave barrel so as to rotationally drive the slave barrel, the rotational driving of the slave barrel being synchronous with the rotational driving of the synchronizing shaft and the rotational driving of the master drive barrel by the motor.

In another aspect, the first coupling assembly includes the master drive sprocket, a synchronizing shaft in-sprocket, and a first drive connecting chain coupled to the master drive sprocket and the synchronizing shaft in-sprocket.

In another aspect, the second coupling assembly includes a slave drive sprocket arranged at the first end of the slave barrel, a synchronizing shaft out-sprocket, and a second drive connecting chain coupled to the slave drive sprocket and the synchronizing shaft out-sprocket.

In another aspect, the arrangement further includes a first interface support bracket having a first extending bracket, and a second interface support bracket having a second extending bracket. The synchronizing shaft is freely rotatably coupled to the first and second interface support brackets via the first and second extending brackets, respectively.

In another aspect, the first end of the master drive barrel passes through the first interface support bracket and the second end of the master drive barrel engages the second interface support bracket and is supported thereby, and wherein the first coupling assembly is arranged proximate the second interface support bracket.

In another aspect, the first end of the slave barrel engages the first interface support bracket and is supported thereby, and the second end of the master drive barrel passes through the second interface support bracket, and wherein the second coupling assembly is arranged proximate the first interface support bracket.

In another aspect, the arrangement further includes: a second slave barrel, having a first end and a second end; a second synchronizing shaft having a first end and a second end; a third coupling assembly; a fourth coupling assembly; a third interface support bracket; and a fourth interface support bracket. The second synchronizing shaft is rotationally driven at its second end by the third coupling assembly, the rotational driving of the second synchronizing shaft being synchronous with the rotational driving of the slave barrel and the rotational driving of the master drive barrel by the motor; and the second slave barrel is rotationally driven at its first end by the fourth coupling assembly, the fourth coupling assembly rotationally coupling the first end of the second synchronizing shaft with the first end of the second slave barrel so as to rotationally drive the second slave barrel, the rotational driving of the second slave barrel being synchronous with the rotational driving of the second synchronizing shaft, the slave barrel, and the rotational driving of the master drive barrel by the motor.

In another aspect, the first end of the slave barrel passes through the third interface support bracket and the second end of the slave barrel engages the fourth interface support bracket and is supported thereby, and wherein the third coupling assembly is arranged proximate the fourth interface support bracket.

In another aspect, the first end of the second slave barrel engages the third interface support bracket and is supported thereby and the second end of the second slave barrel passes through the fourth interface support bracket, and wherein the fourth coupling assembly is arranged proximate the third interface support bracket.

According to yet another aspect of the present invention an assembly for driving fire curtains includes: (a) an arrangement extending across and opening defined by at least one structural element of a building, the arrangement having: (i) a motor having an output shaft, (ii) a master drive barrel having a first end and a second end, the first end being rotationally driven by the output shaft of the motor, the master drive barrel having, at the second end, a master drive sprocket, (iii) a synchronizing shaft having a first end and a second end, the synchronizing shaft being rotationally driven at its second end by a first coupling assembly that includes the master drive sprocket, the rotational driving of the synchronizing shaft being synchronous with the rotational driving of the master drive barrel by the motor, and (iv) a slave barrel, having a first end and a second end, the slave barrel being rotationally driven at its first end by a second coupling assembly that rotationally couples the first end of the synchronizing shaft with the first end of the slave barrel so as to rotationally drive the slave barrel, the rotational driving of the slave barrel being synchronous with the rotational driving of the synchronizing shaft and the rotational driving of the master drive barrel by the motor; (b) a first curtain segment having a first curtain leading edge positionable away from the master drive barrel and a first curtain trailing edge arranged at the master drive barrel, the first curtain segment being drivable by the arrangement between a first, retracted position in which the first curtain leading edge is positioned at the master drive barrel and a second, extended position in which the first curtain leading edge is positioned away from the master drive barrel; and (c) a second curtain segment having a second curtain leading edge positionable away from the slave barrel and a second curtain trailing edge arranged at the slave barrel, the second curtain segment being drivable by the arrangement between a first, retracted position in which the second curtain leading edge is positioned at the slave barrel and a second, extended position in which the second leading edge is positioned away from the master drive barrel. The arrangement is configured to synchronize the driving of the first and second curtains between the respective first and second positions.

In another aspect, the first coupling assembly includes the master drive sprocket, a synchronizing shaft in-sprocket, and a first drive connecting chain coupled to the master drive sprocket and the synchronizing shaft in-sprocket.

In another aspect, the second coupling assembly includes a slave drive sprocket arranged at the first end of the slave barrel, a synchronizing shaft out-sprocket, and a second drive connecting chain coupled to the slave drive sprocket and the synchronizing shaft out-sprocket.

In another aspect, the assembly further includes: a first interface support bracket having a first extending bracket; and a second interface support bracket having a second extending bracket. The synchronizing shaft is freely rotatably coupled to the first and second interface support brackets via the first and second extending brackets, respectively.

In another aspect, the first end of the master drive barrel passes through the first interface support bracket and the second end of the master drive barrel engages the second interface support bracket and is supported thereby, and wherein the first coupling assembly is arranged proximate the second interface support bracket.

In another aspect, the first end of the slave barrel engages the first interface support bracket and is supported thereby, and the second end of the master drive barrel passes through the second interface support bracket, and wherein the second coupling assembly is arranged proximate the first interface support bracket.

In another aspect, the assembly further includes: a second slave barrel, having a first end and a second end; a second synchronizing shaft having a first end and a second end; a third coupling assembly; a fourth coupling assembly; a third interface support bracket; and a fourth interface support bracket. The second synchronizing shaft is rotationally driven at its second end by the third coupling assembly, the rotational driving of the second synchronizing shaft being synchronous with the rotational driving of the slave barrel and the rotational driving of the master drive barrel by the motor; and the second slave barrel is rotationally driven at its first end by the fourth coupling assembly, the fourth coupling assembly rotationally coupling the first end of the second synchronizing shaft with the first end of the second slave barrel so as to rotationally drive the second slave barrel, the rotational driving of the second slave barrel being synchronous with the rotational driving of the second synchronizing shaft, the slave barrel, and the rotational driving of the master drive barrel by the motor.

In another aspect, the first end of the slave barrel passes through the third interface support bracket and the second end of the slave barrel engages the fourth interface support bracket and is supported thereby, and wherein the third coupling assembly is arranged proximate the fourth interface support bracket.

In another aspect, the first end of the second slave barrel engages the third interface support bracket and is supported thereby and the second end of the second slave barrel passes through the fourth interface support bracket, and wherein the fourth coupling assembly is arranged proximate the third interface support bracket.

BRIEF DESCRIPTION OF THE DRAWINGS

The above and/or other aspects and advantages will become more apparent and more readily appreciated from the following detailed description of the disclosed embodiments taken in conjunction with the accompanying drawings in which.

DETAILED DESCRIPTION

Figure 1:
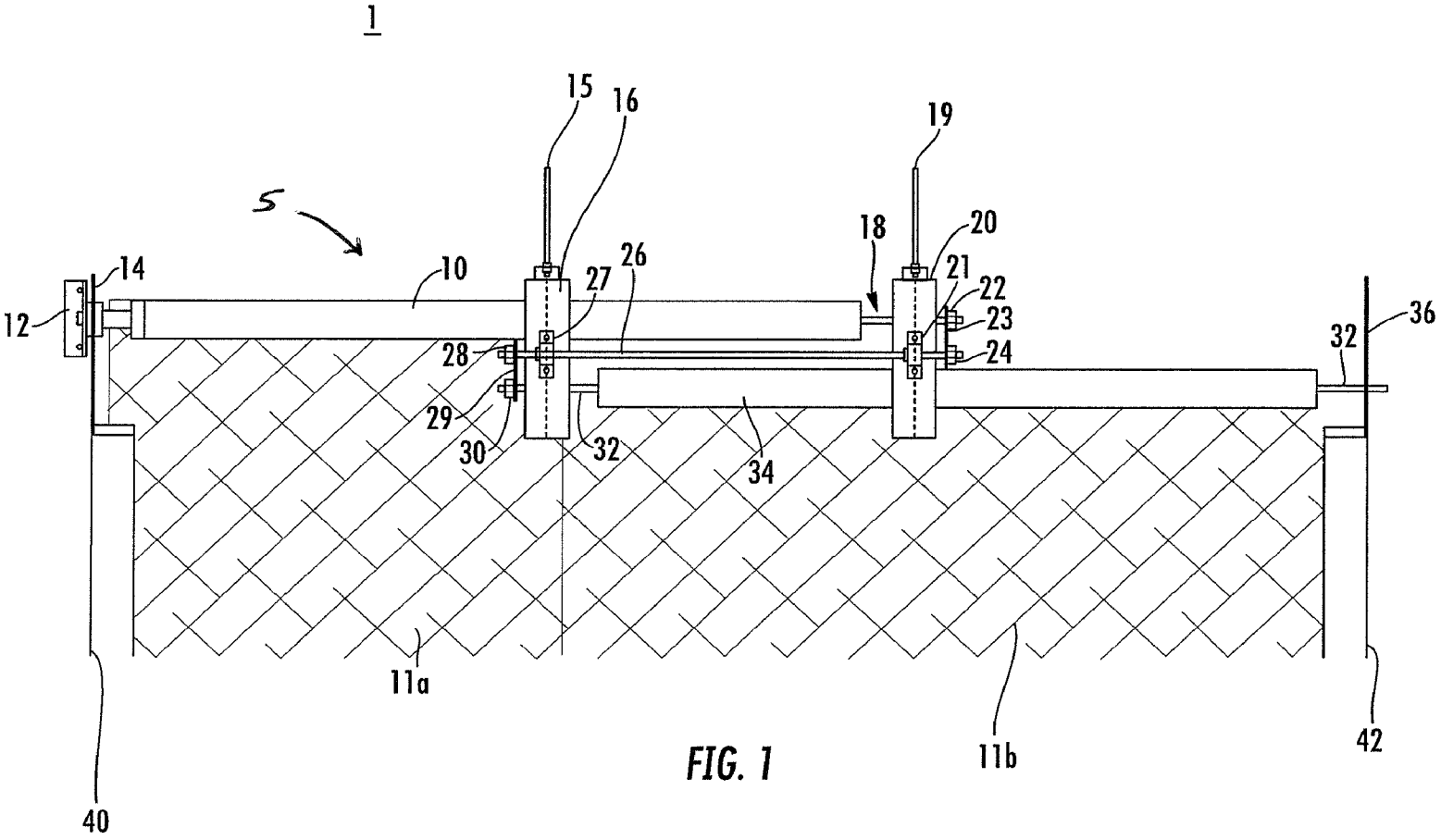
FIGS. 1, 2 and 3 are front elevational, plan and section views, respectively, illustrating a master/slave shaft assembly having master and slave barrels each attached to a section of a door/curtain, in accordance with an embodiment of the present invention.
Figure 2:
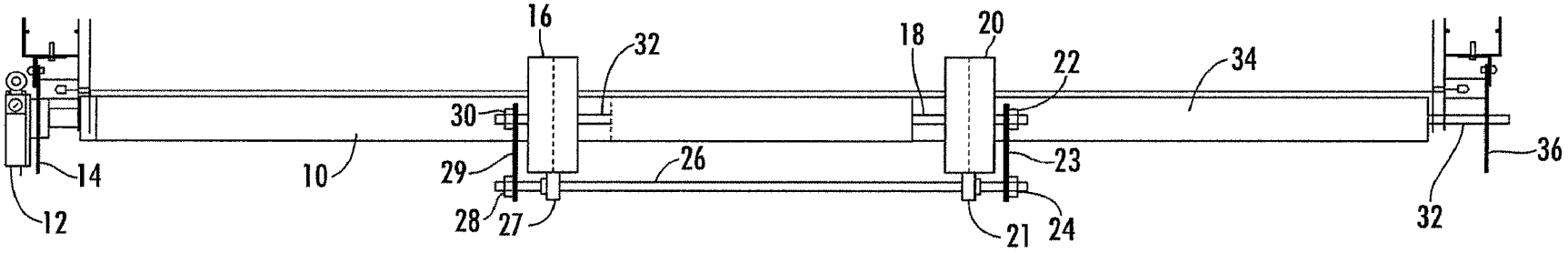
Figure 3:
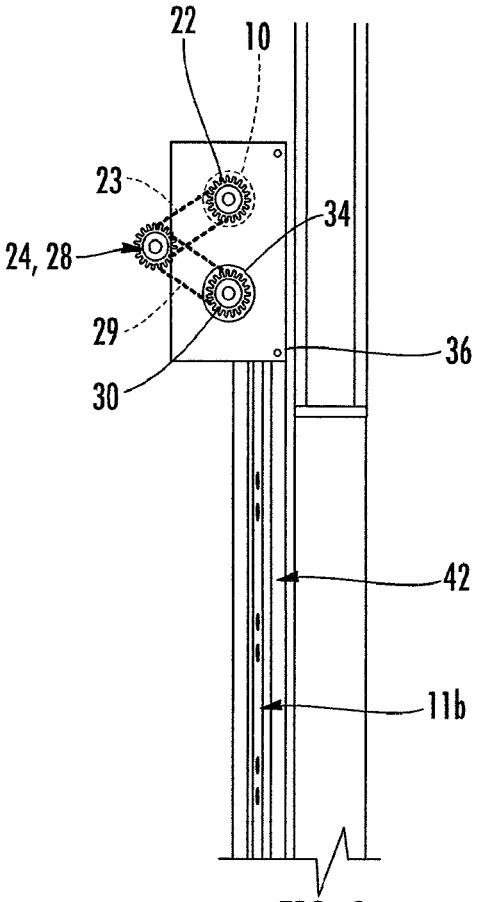

The disclosed exemplary embodiments relate to a master/slave shaft assembly provided with at least one inventive synchronizing shaft configured to couple and synchronize a master (drive) barrel with a slave barrel, or a driven slave barrel with a further slave barrel, without the need for an individual motor for each barrel. Exemplary configurations of inventive master/slave shaft assembly will be described below in detail with regard to FIGS. 1 to 8.

According to an exemplary embodiment, discussed herein in connection with FIGS. 1-5, a fire door/curtain assembly 1 is shown having master/slave shaft arrangement 5 and a door or curtain having two or more sections 11a, 11b. The arrangement 5 has a master drive barrel 10, driven by a motor drive 12, attached to a first section 11a of a door/curtain. The motor drive 12 is rotationally engaged with a first end of the master drive barrel 10 through of an end plate 14. The master drive barrel 10 includes master drive barrel shaft 18.

As can be seen, for example, in FIG. 1, the master drive barrel shaft 18 of the master drive barrel 10 passes through, on the end that engages the motor 12, the end plate 14. The motor 12 has an output shaft (not shown) which, through optional step-down planetary gearing as is known in the art, applies, when the door or curtain needs to be raised or lowered, rotational driving force to the master drive barrel shaft 18. As viewed from left to right in FIG. 1, the master drive barrel 10 passes through a first interface support bracket 16, which hangs from, and is supported by, a first supporting rod 15. The rod 15 may be, for example, secured to the ceiling of a building, a projection from the ceiling (see, e.g., FIG. 5) or fastened to a wall of a structure along a top of an opening across which the assembly 1 is positioned. At the end of the master drive barrel 10 distal the motor 12, the master drive barrel shaft 18 engages a second interface support bracket 20, passing through second interface support bracket 20 supported by a second supporting rod 19, and terminates at a drive barrel sprocket 22.

The motor 12 applies a rotational force to the master drive barrel 10 via a coupling or via a step-down gearing arrangement, for example a direct coupling, with the leftmost ("input") end of the master drive barrel shaft 18. As can be seen clearly in FIG. 4, the rotation applied by the motor 12 to the master drive barrel 10 and its shaft 18, is passed to a synchronizing shaft 26 via a drive connecting chain 23, which couples the drive barrel sprocket 22 of the master drive barrel 10, to an interface sprocket 24 arranged at the rightmost end of the synchronizing shaft 26, that is, the end of the synchronizing shaft 26 distal the motor 12.

Figure 4:
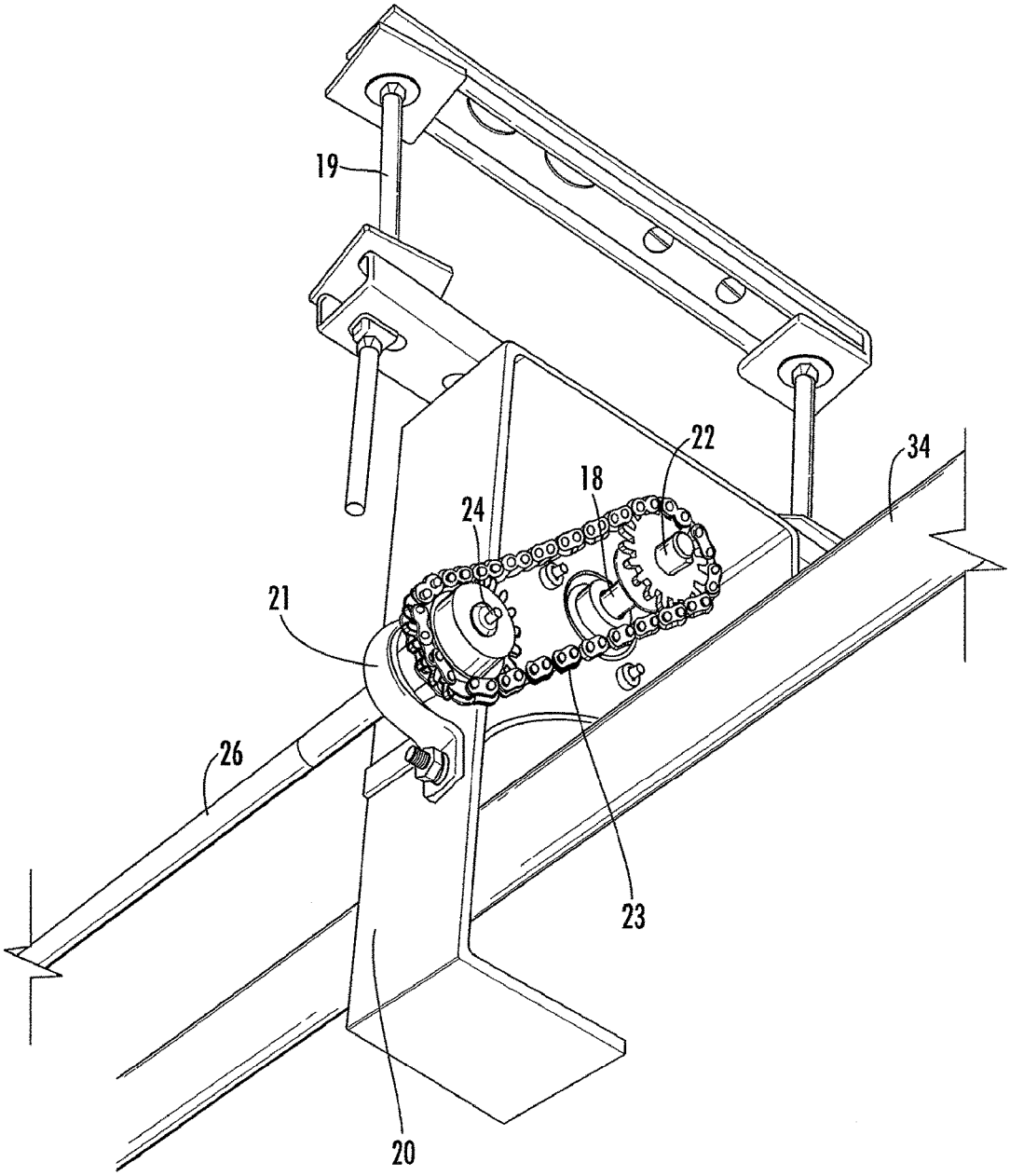
FIG. 4 is a right, front, lower perspective view showing a portion of the master/slave shaft assembly shown in FIGS. 1-3.
Figure 5:
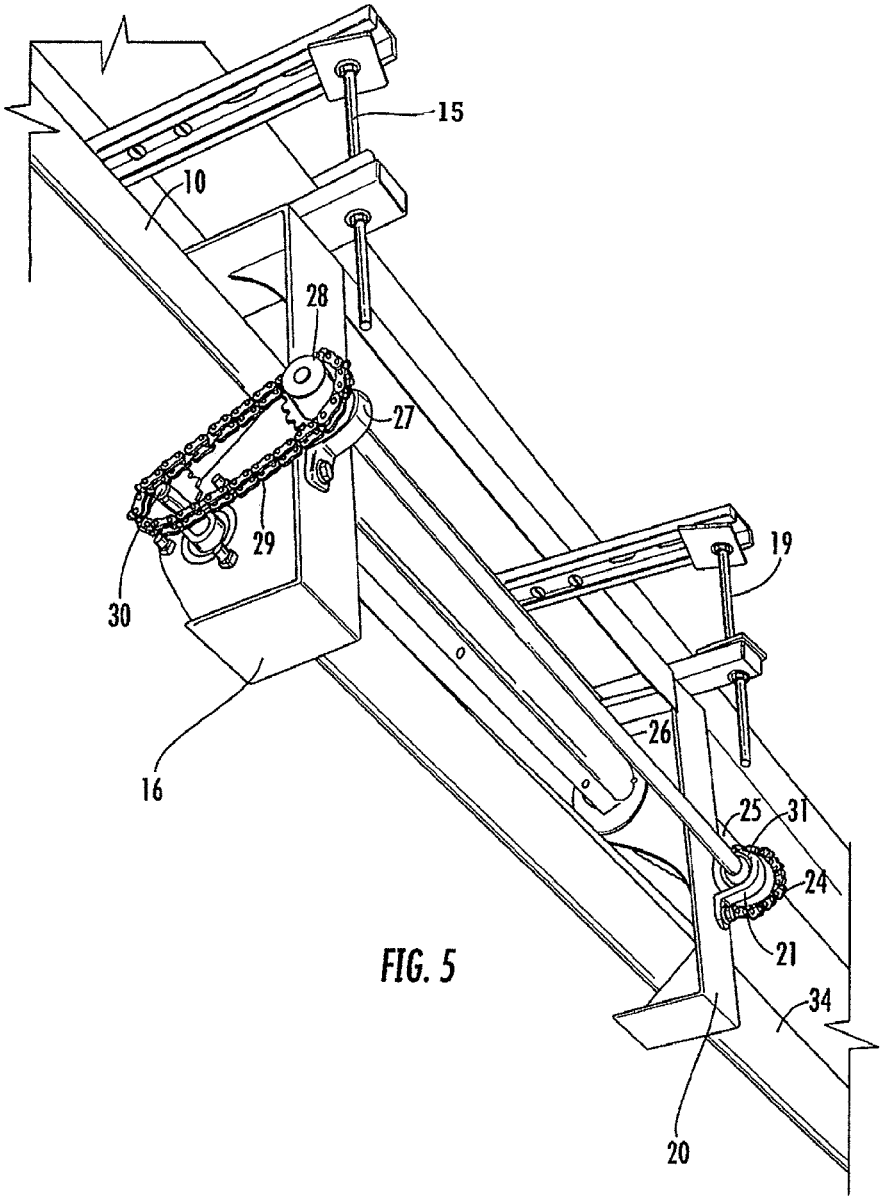
FIG. 5 is a left, front, lower perspective view showing a portion of the master/slave shaft assembly shown in FIGS. 1-3.

As can be seen from, for example, FIGS. 1, 4 and 5, the leftmost end, that is the end closer to the motor, of the synchronizing shaft 26, is rotatably mounted to the first interface support bracket 16 by a first extending bracket 27. The rightmost end is rotatably mounted to a second, horizontally disposed, interface support bracket 20 by a second extending bracket 21.

By the above arrangement, the first interface support bracket 16 provides a pass-through for the master drive barrel 10, such that the master drive barrel 10, with its associated shaft 18, is rotatably mounted between end plate 14 and the second interface support bracket 20, but passes through an opening in the first interface support bracket 16. Also by this arrangement, the synchronizing shaft 26 is rotatably mounted between the first interface support bracket 16 and the second interface support bracket 20, via the above-mentioned first and second extending brackets 27 and 21.

As can be seen, for example, in FIG. 5, the synchronizing shaft 26 is supported on the second interface support bracket 20 by the second extending bracket 21. The synchronizing shaft 26 is supported on the first interface support bracket 16 by the first extending bracket 27. As can be seen from the figures, the first and second extending brackets are mounted to the front of the interface support brackets 16 and 20, respectively. However, this rotation support for the synchronizing shaft 26 could alternatively be provided by integrally formed brackets in the first and second interface support brackets.

As discussed above, the rotational force applied to the master drive barrel 10 by the motor 12, via the master drive barrel shaft 18, rotatably drives the barrel sprocket 22. This rotational driven force of the drive barrel sprocket 22 is applied to the interface in-sprocket 24 of synchronizing shaft 26 via the drive connecting chain 23, which couples the drive barrel sprocket 22 to the interface in-sprocket 24, setting the synchronizing shaft 26 in rotational motion that is synchronized with the rotational motion provided by the motor 12 to the master drive barrel shaft 10.

The rotation provided to the synchronizing shaft 26 by the sprocket and chain assembly 22, 23 and 24 is then conveyed to a slave barrel 34. This is achieved by a second sprocket and chain assembly, which consists of (a) an interface sprocket 28, arranged at the leftmost side of the synchronizing shaft 26, that is, the side of the synchronizing shaft 26 closer to the motor, (b) a drive connecting chain 29, and (c) a slave barrel sprocket 30 affixed at the leftmost end of a slave barrel shaft 32 of the slave barrel 34. This second sprocket and chain assembly 28, 29 and 30, seen clearly, for example, in FIG. 5, conveys the rotational motion of the synchronizing shaft 26 to the slave barrel 34.

As can be seen in FIGS. 1, 4 and 5, the slave barrel 34 passes through the second interface support bracket 20, and is attached to a second section 11b of a door/curtain. At the rightmost end of the exemplary master/slave shaft assembly 1 of FIGS. 1-5, the slave barrel shaft 32 terminates and its end and is rotationally supported at a second end plate 36. Thus, the slave barrel 34, via its shaft 32, is rotationally mounted between the first interface support bracket 16 and the end plate 36, but passes through the second interface support bracket 20.

The above-described coupling of the single motor 12 to the master drive barrel 10, in cooperation with the first and second sprocket assemblies at each end of the synchronizing shaft 26, serves to synchronously pass along the rotational drive of the single motor 12 ultimately to the slave barrel 34, without the need to provide a second motor to drive the slave barrel 34. For example, if the master drive barrel 10 is rotated by the motor in a clockwise direction, e.g., to move curtain 11a to a closed position, the synchronizing shaft 26 will rotate in a counter-clockwise direction and cause the slave barrel to rotate in a clockwise direction at substantially the same rpm as the master drive barrel This permits curtains 11a and 11b to be lowered synchronously to one another, allowing the staggered barrels (i.e., the master drive barrel 10 and the slave barrel 34) to span a relatively large space without too much deflection of the barrels and without the need for a control system to synchronize multiple motors. Of course, operation of motor 1 in a counter-clockwise direction will raise the curtain segments 11a, 11b in the above example.

As can be seen most clearly in the perspective views of FIGS. 4 and 5, the first and second sprocket assemblies are arranged so as to extend obliquely with respect to the longitudinal extent of the master/slave shaft assembly 1 i.e., into and/or out of the plane containing FIG. 1. This arrangement allows the depth of the assembly 1 to be minimized. However, the first and second sprocket assemblies could also be arranged perpendicularly to the longitudinal extent of the assembly 1. In any event, it should be clear that the respective rotational axes of the master drive barrel and slave drive barrel are coplanar. However, this is a matter of design choice and those of ordinary skill will appreciate that the above described arrangement can also be used to operate curtains that are not disposed along a planar opening, such as around a curve, by using a different gearing arrangement for 29, e.g., by way of non-limiting example, a beveled gearing arrangement, etc. In such "curved" arrangements, the rotational axes of all of the drive barrels (i.e., the master drive barrel and/or one of more slave drive barrels) will not be coplanar.

As shown, for example, in FIG. 1, the first and second end plates 14 and 36 form a part of first and second guide assemblies 40 and 42, respectively.

Figure 6:
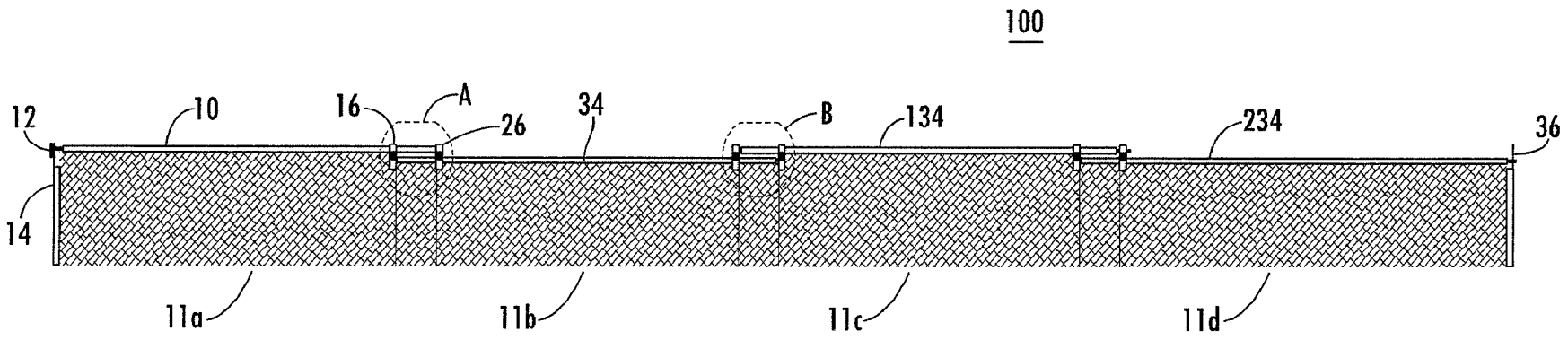
FIG. 6 is an elevational view of another embodiment in which multiple slave barrels are driven by a single master drive barrel.
Figure 7:
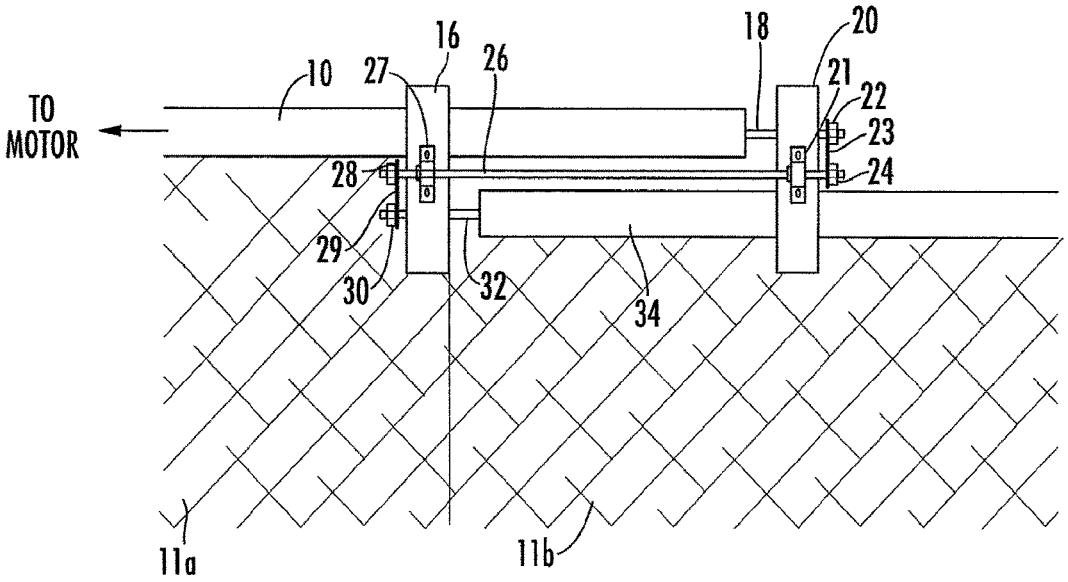
FIG. 7 is a detail of portion A of FIG. 6.
Figure 8:
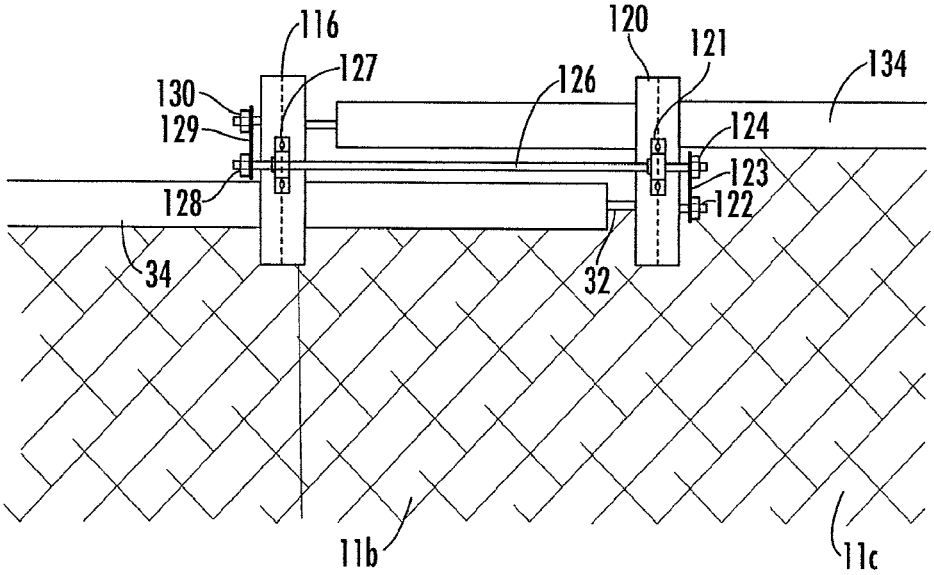
FIG. 8 is a detail of portion B of FIG. 6.

The above-described embodiment of the master/slave shaft assembly illustrates such an assembly having two barrels, that is, a single master drive barrel and a single slave barrel, with the assembly terminating at the end of the slave barrel at a second end plate. However, the present invention is not limited to use with only two barrels. In fact, the inventive features of the present invention can be applied to drive multiple slave barrels, with associated curtain segments, by a single motor driving a single master drive barrel. Such an embodiment, in which three slave barrels are driven by a single motor and a single master drive barrel, is illustrated in FIGS. 6, 7 and 8. As will be appreciated by those of skill in the art, the multi-barrel embodiment is not limited to three slave barrels and can extend over even longer distances by addition of further slave barrels.

FIG. 6 is an elevational view of such a multi-barrel master/slave shaft assembly 100. FIG. 7 is an expanded view of area of interest A circled in FIG. 6. FIG. 8 is an expanded view of area of interest B circled in FIG. 6.

In this assembly 100, the portion of the assembly 100 closest to the motor 12, i.e., the portion towards the left of the figure, in particular in the area of the first and second interface support brackets 16 and 20, functions in exactly the same manner as the portion of assembly 1 shown in FIGS. 1-5. Thus, corresponding elements in this portion of FIG. 6, and in particular FIG. 7, will be described using the same reference numerals as above.

Just as in the first embodiment, the motor 12 drives the master drive barrel 10, which passes through the first interface support bracket 16. Master drive barrel shaft 18 is rotationally supported by the second interface support bracket 20. The master drive barrel shaft 18 of the master drive barrel 10 passes through, on the end that engages the motor 12, the end plate 14. As viewed from left to right in FIGS. 6 and 7, the master drive barrel 10 passes through the first interface support bracket 16, which hangs from, and is supported by, a first supporting rod 15, which was illustrated in, for example, FIGS. 1, 4 and 5, but which, for the sake of simplicity of illustration, is not shown in FIGS. 6 and 7. At the end of the master drive barrel distal the motor 12, the master drive barrel shaft 18 of the master drive barrel 10 engages the second interface support bracket 20, passing through the second interface support bracket 20, and being supported thereby, and terminating, after passing through the second interface support bracket 20, in a drive barrel sprocket 22.

The motor 12 applies a rotational force via a coupling with the leftmost end of the master drive barrel shaft 18. In this embodiment, just as in FIG. 4, which was used to illustrate the first embodiment, the rotation applied by the motor 12 to the master drive barrel 10 and its shaft 18, is passed to a first synchronizing shaft 26 via a first sprocket and chain assembly 22, 23, 24. The rotation is passed along by the drive connecting chain 23 coupling the drive barrel sprocket 22 to the interface in-sprocket 24 arranged at the rightmost end of the synchronizing shaft 26, that is, the end of the synchronizing shaft distal the motor 12.

As can be seen in FIG. 7, the leftmost end, that is the end closer to the motor, of the first synchronizing shaft 26, is rotatably mounted to the first interface support bracket 16 by a first extending bracket 27. The rightmost end is rotatably mounted to the second interface support bracket 20 by a second extending bracket 21.

By this engagement, the first interface support bracket 16 provides a pass through for the master drive barrel 10, such that the master drive barrel 10, and associated shaft 18, is rotatably mounted between the end plate 14 and the second interface support bracket 20, but passes through an opening in the first interface support bracket 16. Also by this engagement, the first synchronizing shaft 26 is rotatably mounted between the first interface support bracket 16 and the second interface support bracket 20, via first and second extending brackets 27 and 21.

The first synchronizing shaft 26 is supported on the second interface support bracket 20 by the second extended bracket 21. The first synchronizing shaft 26 is supported on the first interface support bracket 16 by the first extending bracket 27. As in the first embodiment, in the second embodiment, the first and second extending brackets are mounted to the front of the interface support brackets 16 and 20, respectively. However, as discussed above in relation to the first embodiment, the rotation support could alternatively be provided by integrally formed brackets in the first and second interface support brackets.

As discussed above, the rotational force applied to the master drive barrel 10 by the motor 12, via the master drive barrel shaft 18, rotatably drives the barrel sprocket 22. This rotational driven force of the drive barrel sprocket 22 is applied to the interface in-sprocket 24 of the first synchronizing shaft 26 via the drive connecting chain 23, which couples the drive barrel sprocket 22 to the interface in-sprocket 24, setting the first synchronizing shaft 26 in rotational motion that is synchronized with the rotational motion provided by the motor 12 to the master drive barrel shaft 10. This rotation provided to the synchronizing shaft 26 by the sprocket and chain assembly 22, 23 and 24 is then passed along by the synchronizing shaft 26 to a slave barrel 34.

This is achieved by a second sprocket and chain assembly, which consists of (a) the interface out-sprocket 28, arranged at the leftmost side of the first synchronizing shaft 26, that is, the side of the synchronizing shaft 26 closer to the motor, (b) the drive connecting chain 29, and (c) the slave barrel sprocket 30 affixed at the leftmost end of a slave barrel shaft 32 of the first slave barrel 34. This second sprocket and chain assembly 28, 29 and 30, seen clearly in FIG. 5, passes the rotational motion of the first synchronizing shaft 26 to the first slave barrel 34, via the second sprocket and chain assembly 28, 29, 30 that couples the first synchronizing shaft 26 and the first slave barrel shaft 32.

As can be seen in FIG. 7, the first slave barrel 34 passes through the second interface support bracket 20. In the first embodiment, the slave barrel 34 terminates by engaging the end plate 36. However, in the second embodiment, the assembly 100 is arranged such that the first slave barrel 34 drives a second synchronizing shaft 126, which in turn drives a second slave barrel 134, which in turn can drive additional slave barrels.

This can be seen in FIG. 8, which is an expanded view of area of interest B from FIG. 6 and shows the area to the right of the area shown in FIG. 7. As can be seen in FIG. 8, rather than have the first slave barrel 34 terminate by rotational connection to an end plate, as in the first embodiment, in the second embodiment, in the assembly 100, the first slave barrel 34 is arranged, together with a set of third and fourth interface support brackets, a second synchronizing shaft and two further sprocket and chain assemblies, to further synchronously pass along the rotational drive from the motor to additional slave barrels.

In particular, as illustrated in FIG. 8, a second driving stage of the assembly 100 (area of interest B in FIG. 6) is shown in detail. As shown in FIG. 8, the first slave barrel 34 passes through a third interface support bracket 116 and then terminates, at its barrel shaft 32, after passing through a fourth interface support bracket 120, in a slave barrel sprocket 122. At the end of the first slave barrel 34 distal the motor 12, the first slave barrel shaft 32 of the first slave barrel 34 engages the fourth interface support bracket 120, passing through the fourth interface support bracket 120, and being supported thereby, and terminates in the slave barrel sprocket 122.

As discussed above in relation to FIG. 7, the first slave barrel 34 is rotationally driven by virtue of its coupling with the second sprocket and chain assembly 28, 29 and 30. The rotational force of the first slave barrel 34 and its shaft 32 rotationally drives a second synchronizing shaft 126 by a third sprocket and chain assembly consisting of the first slave barrel sprocket 122, a drive connecting chain 123 and a second interface in-sprocket 124. The drive connecting chain 123 couples the first slave barrel sprocket 122 to the second interface in-sprocket 124 arranged at the rightmost end of the second synchronizing shaft 126, that is, the end of the second synchronizing shaft 126 distal the motor 12.

As can be seen in FIG. 8, the leftmost end, that is the end closer to the motor, of the second synchronizing shaft 126, is rotatably mounted to the third interface support bracket 116 by a third extending bracket 127. The rightmost end is rotatably mounted to the fourth interface support bracket 120 by a fourth extending bracket 121.

By this engagement, the third interface support bracket 116 provides a pass through for the first slave barrel 34, such that the first slave barrel 34, and associated shaft 32, is rotatably mounted between the second interface support bracket 20 and the fourth interface support bracket 120, but passes through an opening in the third interface support bracket 116. Also by this engagement, the second synchronizing shaft 126 is rotatably mounted between the third interface support bracket 116 and the fourth interface support bracket 120, via third and fourth extending brackets 127 and 121.

The second synchronizing shaft 126 is supported on the fourth interface support bracket 120 by the fourth extending bracket 121. The second synchronizing shaft 126 is supported on the third interface support bracket 116 by the third extending bracket 127. The third and fourth extending brackets are mounted to the front of the interface support brackets 116 and 120. However, the rotation support could alternatively be provided by integrally formed brackets in the third and fourth interface support brackets.

The rotational force applied to the first slave barrel 34 drives the first slave barrel sprocket 122. This rotational driven force of the first slave barrel sprocket 122 is applied to the second interface in-sprocket 124 of the second synchronizing shaft 126 via the drive connecting chain 123, which couples the first slave barrel sprocket 122 to the second interface in-sprocket 124, setting the second synchronizing shaft 126 in rotational motion that is synchronized with the rotational motion provided by the motor 12, the master drive barrel shaft 10, and the first slave barrel 34. This rotation provided to the second synchronizing shaft 126 by the sprocket and chain assembly 122, 123 and 124 is then passed along by the second synchronizing shaft 126 to a second slave barrel 134.

The rotational drive of the second slave barrel 134 is achieved by a fourth sprocket and chain assembly, which consists of (a) the interface sprocket 128, arranged at the leftmost side of the second synchronizing shaft 126, that is, the side of the second synchronizing shaft 126 closer to the motor, (b) the drive connecting chain 129, and (c) the second slave barrel sprocket 130 affixed at the leftmost end of a second slave barrel shaft 132 of the second slave barrel 134. This fourth sprocket and chain assembly 128, 129 and 130 between the second synchronizing shaft 126 and the second slave barrel shaft 132 passes the rotational motion of the second synchronizing shaft 126 to the second slave barrel 134, which controls the winding up and down of the curtain section 11c. As can be seen in FIG. 8, the second slave barrel 134 passes through the fourth interface support bracket 120.

Referring back to FIG. 6, in accordance with the second embodiment, additional stages, with further slave barrels, can be employed to cover larger and larger widths. For example, FIG. 6 shows a third driving stage at which the second slave barrel 134 drives a third slave barrel 234, which controls the winding up and down of a curtain section 11d. This third driving stage utilizes two interface support brackets and a third synchronizing shaft and functions to pass the driving force of the second slave barrel 134 to the third slave barrel 234 in exactly the same manner as the master drive barrel 10 drives the first slave barrel in, for example, FIG. 7. While three driving stages are shown in FIG. 6, the invention is not limited to this number of stages, and additional stages may be added, as needed, using the techniques described in detail in FIGS. 7 and 8. This permits curtains 11a, 11b, 11c and 11d attached, respectively, to the master drive barrel 10, the first slave barrel 34, the second slave barrel 134 and the third slave barrel 234, to be raised and lowered synchronously to one another, allowing the staggered barrels (i.e., the master drive barrel 10 and the first, second and third slave barrels 34, 134, 234) to span an even larger space with minimal deflection of the barrels and without the need for a control system to synchronize multiple motors.

Although example embodiments have been shown and described in this specification and figures, it would be appreciated by those skilled in the art that changes may be made to the illustrated and/or described example embodiments without departing from their principles and spirit.

What is claimed is:

1. A master/slave shaft arrangement [extending] *for a curtain having two or more sections hanging* across an opening defined by at least one structural element of a building, the arrangement comprising:

a motor having an output shaft;

*a first interface support bracket having a first extending bracket, the first interface support bracket suspended from above the master/slave shaft arrangement;*

*a second interface support bracket having a second extending bracket, the second interface support bracket suspended from above the master/slave shaft arrangement,* a master drive barrel having a first end and a second end, the first end being rotationally driven by the output shaft of the motor *to raise or lower a first section of the curtain*, the master drive barrel [having] *engaging*, at the second end, *the second interface support bracket and terminating in* a master drive sprocket;

a synchronizing shaft having a first end and a second end, the synchronizing shaft being rotationally driven at its second end by a first coupling assembly that includes the master drive sprocket, the rotational driving of the synchronizing shaft being synchronous with the rotational driving of the master drive barrel by the motor, *wherein the synchronizing shaft is freely rotatably coupled to the first and second interface support brackets via the first and second extending brackets, respectively*; and a slave barrel, having a first end and a second end, the slave barrel being *rotationally mounted in the first interface support bracket and* rotationally driven at its first end by a second coupling assembly that rotationally couples the first end of the synchronizing shaft with the first end of the slave barrel so as to rotationally drive the slave barrel *to raise and lower a second section of the curtain*, the rotational driving of the slave barrel being synchronous with the rotational driving of the synchronizing shaft and the rotational driving of the master drive barrel by the motor.

2. The arrangement according to claim 1, wherein the first coupling assembly includes the master drive sprocket, a synchronizing shaft in-sprocket, and a first drive connecting chain coupled to the master drive sprocket and the synchronizing shaft in-sprocket.

3. The arrangement according to claim 2, wherein the second coupling assembly includes a slave drive sprocket arranged at the first end of the slave barrel, a synchronizing shaft out-sprocket, and a second drive connecting chain coupled to the slave drive sprocket and the synchronizing shaft out-sprocket.

[4. The arrangement according to claim 3, further comprising:

a first interface support bracket having a first extending bracket; and a second interface support bracket having a second extending bracket, wherein the synchronizing shaft is freely rotatably coupled to the first and second interface support brackets via the first and second extending brackets, respectively.]

5. The arrangement according to claim [4] *1*, wherein the first end of the master drive barrel passes through *an opening in* the first interface support bracket and the second end of the master drive barrel engages the second interface support bracket and is supported thereby, and wherein the first coupling assembly is arranged proximate the second interface support bracket.

6. The arrangement according to claim 5, wherein the first end of the slave barrel engages the first interface support bracket and is supported thereby, and the second end of the master drive barrel passes through *an opening in* the first interface support bracket, and wherein the second coupling assembly is arranged proximate the first interface support bracket.

7. The arrangement according to claim 1, further comprising:

*a third interface support bracket having a third extending bracket, the third interface support bracket suspended from above the master/slave shaft arrangement;*

*a fourth interface support bracket having a fourth extending bracket, the fourth interface support bracket suspended from above the master/slave shaft arrangement;* a second slave barrel, having a first end and a second end;

a second synchronizing shaft having a first end and a second end;

a third coupling assembly; *and* a fourth coupling assembly;

[a third interface support bracket; and]

[a fourth interface support bracket,]

wherein:

the second synchronizing shaft *is freely rotatably coupled to the third and fourth interface support brackets via the third and fourth extending brackets, respectively, and* is rotationally driven at its second end by the third coupling assembly, the rotational driving of the second synchronizing shaft being synchronous with the rotational driving of the slave barrel and the rotational driving of the master drive barrel by the motor; and the second slave barrel is rotationally driven at its first end by the fourth coupling assembly, the fourth coupling assembly rotationally coupling the first end of the second synchronizing shaft with the first end of the second slave barrel so as to rotationally drive the second slave barrel *to raise and lower a third section of the curtain*, the rotational driving of the second slave barrel being synchronous with the rotational driving of the second synchronizing shaft, the slave barrel, and the rotational driving of the master drive barrel by the motor.

8. The [assembly] *arrangement* according to claim 7, wherein the first end of the *second* slave barrel passes through *an opening in* the third interface support bracket and the second end of the *second* slave barrel engages the fourth interface support bracket and is supported thereby, and wherein the third coupling assembly is arranged proximate the fourth interface support bracket.

9. The arrangement according to claim 8, wherein the first end of the second slave barrel engages the third interface support bracket and is supported thereby and the second end of the second slave barrel passes through *an opening in* the fourth interface support bracket, and wherein the fourth coupling assembly is arranged proximate the third interface support bracket.

10. An assembly for driving fire curtains *having two or more sections*, the assembly comprising:

(a) [an] *a master/slave shaft* arrangement extending across an opening defined by at least one structural element of a building, the arrangement having:

(i) a motor having an output shaft, (*ii*) *a first interface support bracket having a first extending bracket, the first interface support bracket suspended from above the master/slave shaft arrangement;*

(*iii*) *a second interface support bracket having a second extending bracket, the second interface support bracket suspended from above the master/slave shaft arrangement,*

[(ii)] (*iv*) a master drive barrel having a first end, *and* a second end, and a rotational axis, the first end being rotationally driven by the output shaft of the motor, the master drive barrel [having] *engaging*, at the second end, *the second interface support bracket and terminating in* a master drive sprocket,

[(iii)] (*v*) a synchronizing shaft having a first end and a second end, the synchronizing shaft being rotationally driven at its second end by a first coupling assembly that includes the master drive sprocket, the rotational driving of the synchronizing shaft being synchronous with the rotational driving of the master drive barrel by the motor*, wherein the synchronizing shaft is freely rotatably coupled to the first and second interface support brackets via the first and second extending brackets, respectively*, and

[(iv)] (*vi*) a slave barrel, having a first end, a second end, and a rotational axis, the slave barrel being *rotationally mounted in the first interface support bracket and* rotationally driven at its first end by a second coupling assembly that rotationally couples the first end of the synchronizing shaft with the first end of the slave barrel so as to rotationally drive the slave barrel, the rotational driving of the slave barrel being synchronous with the rotational driving of the synchronizing shaft and the rotational driving of the master drive barrel by the motor;

(b) a first curtain segment having a first curtain leading edge positionable away from the master drive barrel and a first curtain trailing edge arranged at the master drive barrel, the first curtain segment being drivable by the arrangement between a first, [retracted] *raised* position in which the first curtain leading edge is positioned at the master drive barrel and a second, [extended] *lowered* position in which the first curtain leading edge is positioned away from the master drive barrel; and (c) a second curtain segment having a second curtain leading edge positionable away from the slave barrel and a second curtain trailing edge arranged at the slave barrel, the second curtain segment being drivable by the arrangement between a first, [retracted] *raised* position in which the second curtain leading edge is positioned at the slave barrel and a second, [extended] *lowered* position in which the second leading edge is positioned away from the slave drive barrel and thereby being positioned away from the master drive barrel, wherein the arrangement is configured to synchronize the driving of the first and second curtains between the respective first and second positions.

11. The assembly according to claim 10, wherein the first coupling assembly includes the master drive sprocket, a synchronizing shaft in-sprocket, and a first drive connecting chain coupled to the master drive sprocket and the synchronizing shaft in-sprocket.

12. The assembly according to claim 11, wherein the second coupling assembly includes a slave drive sprocket arranged at the first end of the slave barrel, a synchronizing shaft out-sprocket, and a second drive connecting chain coupled to the slave drive sprocket and the synchronizing shaft out-sprocket.

[13. The assembly according to claim 12, further comprising:

a first interface support bracket having a first extending bracket; and a second interface support bracket having a second extending bracket, wherein the synchronizing shaft is freely rotatably coupled to the first and second interface support brackets via the first and second extending brackets, respectively.]

14. The assembly according to claim [13] *10*, wherein the first end of the master drive barrel passes through *an opening in* the first interface support bracket and the second end of the master drive barrel engages the second interface support bracket and is supported thereby, and wherein the first coupling assembly is arranged proximate the second interface support bracket.

15. The assembly according to claim 14, wherein the first end of the slave barrel engages the first interface support bracket and is supported thereby, and the second end of the master drive barrel passes through *an opening in* the first interface support bracket, and wherein the second coupling assembly is arranged proximate the first interface support bracket.

16. The assembly according to claim 10, wherein the master drive barrel rotational axis and the slave barrel rotational axis are coplanar.

17. The assembly according to claim 10, wherein the slave barrel comprises a first slave barrel, the assembly further comprising:

*a third interface support bracket having a third extending bracket, the third interface support bracket suspended from above the master/slave shaft arrangement;*

*a fourth interface support bracket having a fourth extending bracket, the fourth interface support bracket suspended from above the master/slave shaft arrangement;* a second slave barrel, having a first end, a second end, and a rotational axis;

a second synchronizing shaft having a first end and a second end;

a third coupling assembly; *and* a fourth coupling assembly;

[a third interface support bracket; and a fourth interface support bracket,]

wherein:

the second synchronizing shaft is *freely rotatably coupled to the third and fourth interface support brackets via the third and fourth extending brackets, respectively, and is* rotationally driven at its second end by the third coupling assembly, the rotational driving of the second synchronizing shaft being synchronous with the rotational driving of the first slave barrel and the rotational driving of the master drive barrel by the motor; and the second slave barrel is rotationally driven at its first end by the fourth coupling assembly, the fourth coupling assembly rotationally coupling the first end of the second synchronizing shaft with the first end of the second slave barrel so as to rotationally drive the second slave barrel, the rotational driving of the second slave barrel being synchronous with the rotational driving of the second synchronizing shaft, the first slave barrel, and the rotational driving of the master drive barrel by the motor.

18. The assembly according to claim 17, wherein the first end of the first slave barrel passes through *an opening in* the third interface support bracket and the second end of the first slave barrel engages the fourth interface support bracket and is supported thereby, and wherein the third coupling assembly is arranged proximate the fourth interface support bracket.

19. The assembly according to claim 18, wherein the first end of the second slave barrel engages the third interface support bracket and is supported thereby and the second end of the second slave barrel passes through *an opening in* the fourth interface support bracket, and wherein the fourth coupling assembly is arranged proximate the third interface support bracket.

20. The assembly according to claim 17, wherein the rotational axis of the first slave barrel and the rotational axis of the second slave barrel are coplanar.

*21. A master/slave shaft arrangement extending across an opening defined by at least one structural element of a building, the arrangement comprising:*

*a first interface support bracket having a first extending bracket, the first interface support bracket suspended from above the master/slave shaft arrangement;*

*a second interface support bracket having a second extending bracket, the second interface support bracket suspended from above the master/slave shaft arrangement,*

*a motor;*

*a master drive barrel having a first end and a second end, the first end being rotationally driven by and in engagement with the motor to raise or lower a first section of a curtain, the master drive barrel engaging, at the second end, the second interface support bracket and terminating in a master drive sprocket;*

*a synchronizing shaft having a first end and a second end, the synchronizing shaft being rotationally driven at its second end by a first coupling assembly that includes the master drive sprocket, the rotational driving of the synchronizing shaft being synchronous with the rotational driving of the master drive barrel by the motor, wherein the synchronizing shaft is freely rotatably coupled to the first and second interface support brackets via the first and second extending brackets, respectively; and*

*a slave barrel, having a first end and a second end, the slave barrel being rotationally mounted in the first interface support bracket and rotationally mounted in the first interface support bracket and rotationally driven at its first end by a second coupling assembly that rotationally couples the first end of the synchronizing shaft with the first end of the slave barrel so as to rotationally drive the slave barrel to raise or lower a second section of a curtain, the rotational driving of the slave barrel being synchronous with the rotational driving of the synchronizing shaft and the rotational driving of the master drive barrel by the motor.*

* * * * *